United States Patent [19]
Erhart

[11] 3,861,106
[45] Jan. 21, 1975

[54] COUPLING STRUCTURE FOR COOPERATION WITH A MEMBER ANCHORED IN A STONE PART

[75] Inventor: Dieter Erhart, Memmingerberg, Germany

[73] Assignee: Mannesmann-Leichtbau GmbH, Munich, Germany

[22] Filed: Feb. 25, 1974

[21] Appl. No.: 445,600

[30] Foreign Application Priority Data
Feb. 28, 1973  Germany............................ 2309877

[52] U.S. Cl.......................... 52/587, 52/125, 52/166
[51] Int. Cl................................................ E02d 5/76
[58] Field of Search ............ 52/125, 235, 509, 166, 52/513, 703, 707, 587, 709; 294/89; 403/353

[56] References Cited
UNITED STATES PATENTS

| | | | |
|---|---|---|---|
| 3,124,385 | 3/1964 | Neptune | 52/125 X |
| 3,233,319 | 2/1966 | Jenson et al. | 403/353 |
| 3,335,531 | 8/1967 | Grimelli et al. | 52/166 X |

FOREIGN PATENTS OR APPLICATIONS
1,684,278   3/1971   Germany .............................. 52/125

*Primary Examiner*—J. Karl Bell
*Attorney, Agent, or Firm*—Ralf H. Siegemund

[57] ABSTRACT

A head anchored in a stone part can be connected to a biparted gripper with a biparted eye suspendible in a shackle. The biparted parts are held together by a slipped over locking plate and are secured against rotating relative to each other.

9 Claims, 4 Drawing Figures

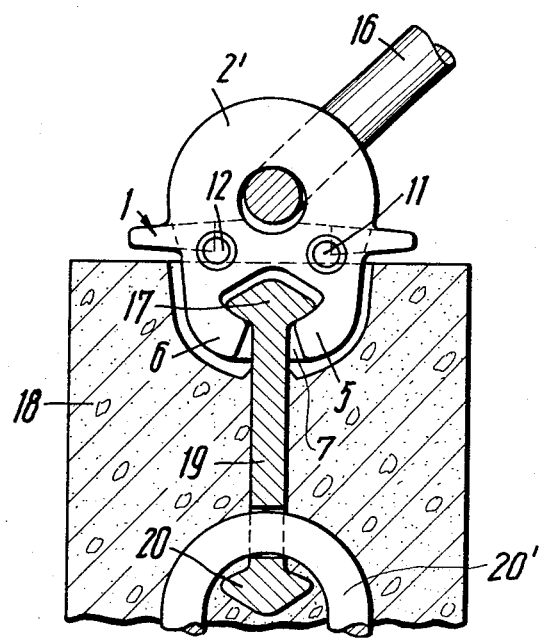
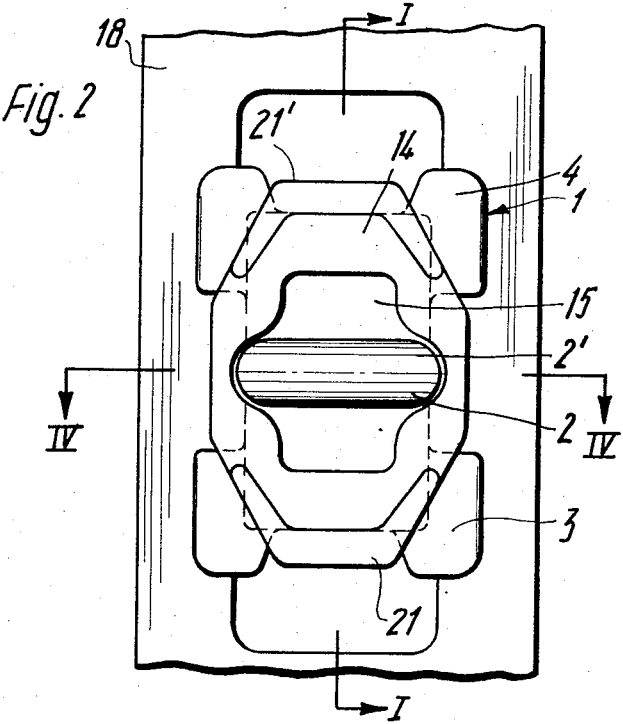

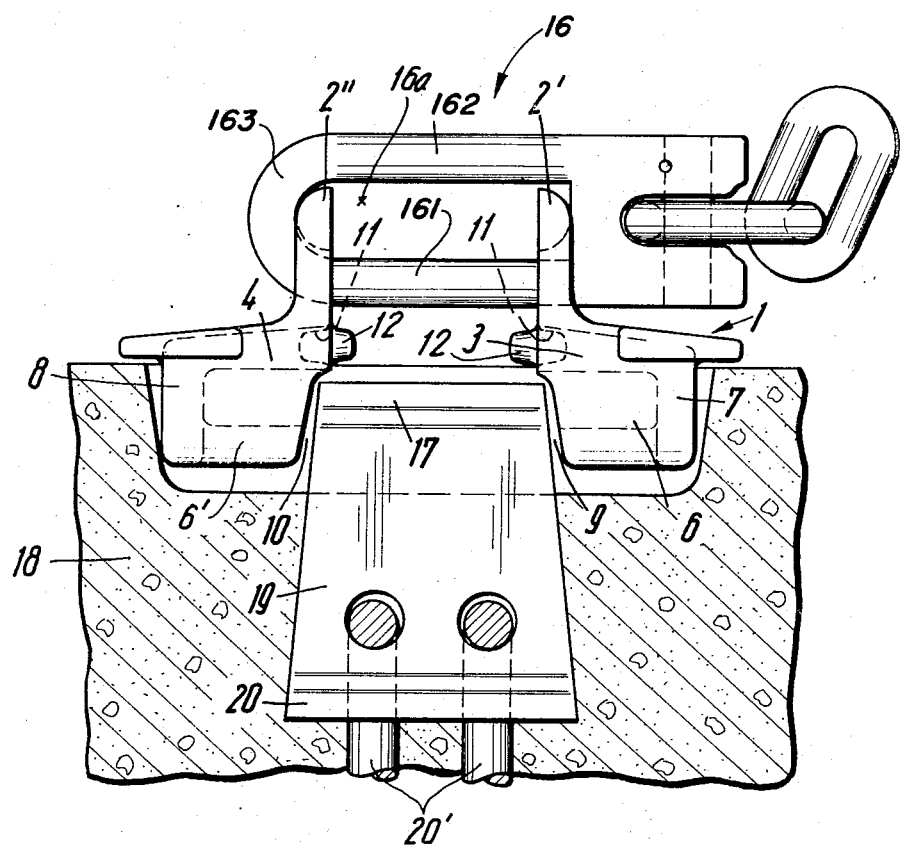

COUPLING STRUCTURE FOR COOPERATION WITH A MEMBER ANCHORED IN A STONE PART

BACKGROUND OF THE INVENTION

The present invention relates to equipment for connecting the head part of an anchoring device, embedded in a piece of artificial stone or masonary, to a carrier.

Carriers to be coupled to anchoring heads are for example comprised of shackle like members. Such a shackle is connected to a plate by means of a semiannular eye so that member and plate permit relative movement to each other in chain link-like fashion. The head can be constructed in various ways. A prior art coupling structure is for example, disclosed in German printed patent application No. 1,684,278 and an improved version for coupling an anchored head to a carrier is contained in my copending application Ser. No. 372,155 filed June 21, 1973. The improvements here refer particularly to increasing the breakage load on the coupling structure, to values above the breaking load on the embedded anchoring device itself. The structure as disclosed in my copending application requires, however, a rather large indentation on one side of each elongated head to permit connection and disconnection of the coupling structure. This has been regarded as a detriment in some instances limiting the versatility of the construction principle involved.

SUMMARY OF THE INVENTION

It is an object of the present invention to provide an improved coupling structure for coupling a head anchored in stone to a carrier, without requiring a long indentation in the stone part to one side of the head but without foregoing the advantages achieved with the structure of my copending application Ser. No. 372,155. Moreover, the construction must not result in any undesired accidental release of the head, i.e., the carrier must be connectable to the anchored head in a manner which permits release only when so desired.

It is another object of the present invention to releasably couple an elongated T member like, anchored head to a shackle like carrier. The head has cross-section which can be described as mushroom like or as two ridges, each with V-shaped outer contour.

In accordance with the preferred embodiment of the invention it is suggested to provide a biparted assembly or a coupling structure having a plate plus eye structure, whereby the partitioning plane runs transverse to the center axis of the eye. The partitioning plane runs through the eye and the plate so that there are two eye parts and two plate parts, in abutting disposition when the assembly is assembled. Each of the two plate parts having jaws for gripping under the head of an anchoring member, but upon separation the parts of the biparted assembly form each other the jaws release this head. Upon placing the parts of the assembly into abutting position, releasable means are provided in addition to hold the parts of the biparted assembly in assembled disposition. The releasable means may be a plate with an aperture or opening which is placed over them, so that the eye structure projects through this aperture while flanges thereof hold the biparted assembly together, acting on an axis transverse to the partitioning plane of the biparted assembly. The opening of the locking plate must be sufficiently wide so that not only the eye, but also a carrier member holding the eye can pass through.

The carrier is preferably constructed as a chain link like shackle with an elongated slot or eye, holding abutting eye parts together when the coupling assembly is assembled, and the shackle eye has up-right position. Upon turning of the shackle by 90° the eye parts can be slid apart in the slot or eye of the shackle, so that the plate parts, together with the jaws, can be separated from each other for releasing and release from the anchored head. However, the plate holding the assembly together should be provided with means preventing the shackle from assuming a side ways position so that the shackle holds the eye parts together as long as the holding plate is in locking position. The jaws are constructed to extend from the plate parts to grip the head from opposite sides; a flange extends from each plate part in frontal abutment with one end of the head when the jaws are in engagement therewith. Since this is to be the case for both parts, the head is held by these oppositely placed flanges from opposite ends, and impeded against lateral displacement from the assembled coupling structure.

The jaws will not abut when the plate parts do, but recesses remain (one on each side along the head) through which accumulated and loosened dirt can be removed. Coupling structure and anchoring head are and remain interconnected in that manner.

In accordance with another feature of the invention, the two plate parts when abutting are locked against rotation of the parts relative to each other so that any asymmetrical, obliquely directed exertion of force by the carrier upon the eye member will not turn the parts relative to each other, and both remain in engagement with the anchored head.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 2 is a top elevation of the coupling structure shown in FIG. 1;

FIG. 3 is a view similar to FIG. 1, but without sectioning and showing the coupling structure in a disconnecting and releasing state of operation; and FIG. 4 is a section view along lines IV—IV of FIG. 2.

Figure 1:
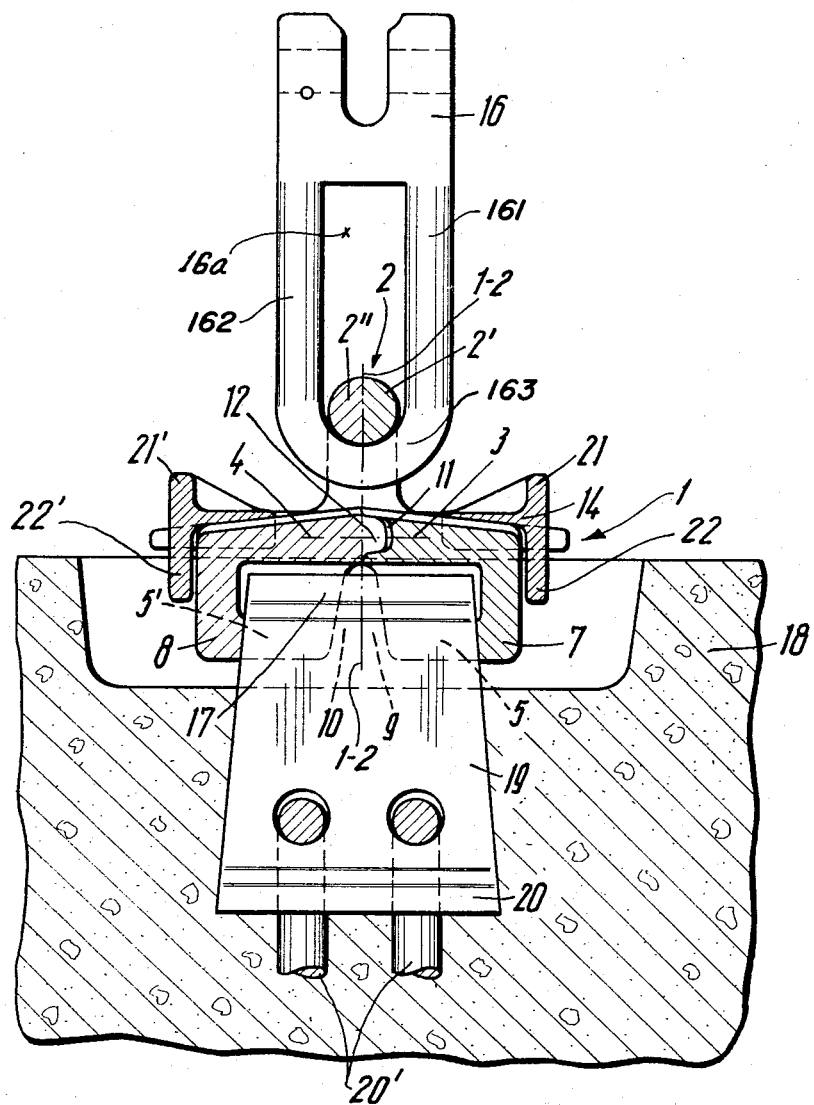
FIG. 1 is a side elevation, partially in section view, of a coupling structure in accordance with the preferred embodiment of the invention shown in an engaging, coupling state of operation.

Proceeding now to the detailed description of the drawings, reference numeral 18 refers to a piece of artificial stone such as concrete into which an anchoring structure 19 has been embedded upon casting the stone (e.g., a concrete plate or the like). A mushroom shaped (as far as cross-section is concerned) foot portion 20 provides for the main anchoring profile inside of the stone and bent rods 20' enhance and re-enforce anchoring.

The anchoring structure 18 has a head 17 of cross-sectional profile as illustrated in FIG. 4. The anchoring structure extends for a certain length transverse to the profile. The head projects into an indentation in part 18 and does not project above the upper surface of part 18. Head 17 has cross-section of two gating V's, each V being the profile of a ridge. One can also say that head 17 on the stem portion of anchoring device 19 resembles a mushroom in cross-section. The head is provided for engagement with coupling structure to be described next.

A shackle like carrier 16 is provided, which however could be replaced by a simple chain link. The shackle 16 has an elongated opening or eye 16a established by two parallel running stem portions 161 and 162, a curved portion 163 and a connecting end which is provided for receiving a bolt, thereby establishing a releasable connection to the end of a chain as can be seen from FIG. 3.

The carrier 16 is engaged and looped by a semi annular eye 2 which is mounted on and projects from a plate 1. The mutually interlooping engagement of parts 2 and 16 provides for a permanent connection, but parts 1 and 16 can be displaced (pivot) relative to each other through pivoting particularly as far as the angle between a normal on plate 1 and a long axis of carrier-shackle 16 is concerned.

Plate 1 and eye 2 are centrally biparted, at right angles to the center axis of eye 2. The partitioning plane 1–2 runs transverse to the plane of the drawing in FIG. 1 and includes the long axis of carrier 16 in that particular disposition. Carrier member 16 may assume horizontal disposition in which case its longitudinal axis runs parallel to plate 1 and one long side of carrier 16 rests on the plate (FIG. 2). Under such circumstances, the two parts can be separated which together constitute eye 2 and plate 1. The two parts are respectively denoted 2' and 2" for eye 2, and 3 and 4 for plate 1, with eye part 2' being integral with plate part 3 and eye part 2" being integral with plate part 4. As can be seen from FIG. 3, the two parts 2' and 2", each constituting an eye can slide in the central eye 16a or opening of shackle 16.

Upon assuming vertical disposition (FIG. 1) shackle 16 holds actually eye parts 2' – 2" together whereupon parts 3 and 4 form the plate 1. Separation of parts 3 and 4 is prevented by shackle 16. The central, oblong eye 16a of shackle 16 may be provided additionally with locking bolts or springs (not shown) for holding parts 2', 2" together, even when the carrier 16 lies side ways as in FIG. 2, so that splitting is permitted only when the the lock is released. However, a different lock will be described shortly.

Each of the two plate parts 3 and 4 is provided with a pair of downwardly extending jaws for gripping under head 7 and holding same. FIG. 4 shows jaws 5 and 6 as extending from part 3, and defining a mating recess for but of somewhat larger dimensions than head 17, permitting also the stem portion of anchoring device 19 to traverse the gap between the jaws with some clearance in between. An analogous pair of jaws extends from plate part 4, one jaw 5' thereof being visible in FIG. 1, the other one, 6' appears in FIG. 3.

Each of the pair of jaws may grip a little less than half of the head 17. Flanges or closing sides 7 and 8 close one side each of the space between the jaws, so that upon receiving a head 17, the head cannot slide off the jaws, along the long axis of head 17 transverse to the plane of the drawing of FIG. 4.

The jaws are provided with recesses such as 9 and 10, so that upon abutment of plate parts 3 and 4 jaws 5 and 5' for example do not abut, but the two recesses 9 and 10 form a lateral opening so that dirt will not accumulate within the confines as defined by the jaws, flanges and plate parts. The recesses 9 and 10 are particularly contoured, so that portions of the jaws gripping under head 17 will not engage.

The plate parts 3 and 4 and eye parts 2', 2" when in abutment define a common planar interface. However, part 4, for example, is provided with a recess 11 and boss or pin 12, respectively being disposed below one end each of the eye part 2" where attached to part 4. Part 3 is provided with complementary recess 11 and boss or pin 12. When the plate parts 3 and 4 abut in the desired mutual orientation, the boss of one engages the recess or indentation of the other and vice versa so that parts 3 and 4 cannot turn relative to each other on an axis transverse to the partitioning plane 1–2. One recess-boss combination may suffice, more than two is likewise possible. Other locking devices could be used, with e.g., corrugation like engagement, to prevent rotational misalignment of the plate parts.

Reference numeral 14 refers to a locking plate, having an opening 15 and covering both parts 3, 4 of plate 1. The opening 15 has contour so that eye 2 can be passed through; the dimension of opening 15 transverse thereto is sufficiently large so that shackle 16 can pass through when in up-right position. Thus, plate 14 can be readily lifted off the assembly, and even removed entirely when the chain is disconnected from the shackle.

Flanges 22 and 22' on plate 14 reach down, in the back of parts 3, 4 and adjacent flanges 7 and 8, to prevent separation of parts 3 and 4 as long as plate 14 sits on plate 1. In other words the two flanges 22 and 22' hold parts 3 and 4 together on and along an axis transverse to the partitioning plane.

Upright flanges 21, 21' on plate 14 prevent the carrier 16 from lieing down completely. The same effect could be obtained by welding a short tube section onto plate 14, about opening 15 thereof. Thus, as long as the plate 14 is on the assembly, the oblong eye 16 is prevented from assuming a position in which the eye parts 2', 2" can slide apart. Normally, assembly 1, 2 (i.e., 3, 4, 2', 2") is suspended from shackle 16, but a wide range of angular displacement of shackle 16 permits attack of any pulling force almost over a semisphere of directions.

The assembly is coupled to an anchored member 19, in the following manner, for example, for purpose of suspending stone part 18 from carrier 16 and/or for positioning the stone otherwise.

Plate 14 is lifted off and carrier 16 is placed side ways so that the two eye parts 2', 2" can be slid away from each other so as to separate parts 3 and 4. The chain may not have been connected to shackle 16 at that point, but that is not important and depends on the circumstances. Please note, that plate 14 when entirely removed from shackle 16 may simply hang on the chain.

The anchoring head 17 is now aligned with the jaws 5, 6, 5' etc. FIG. 3 shows actually that disposition of the plate parts wherein the receiving spaces between the jaws are already aligned with both ends of head 17. One can see from FIG. 3, that the eye 16A of shackle 16 must be at least as long as one has to separate the plate parts, for aligning the receiving space between the several jaws with the head. The plate parts 3 and 4 do not have to be separated for quite the same distance covered by the length of head 17, but still, recesses 9 and 10 provide for adequate clearance of the jaws when (vertically) placed into that aligning disposition.

The jaws will grip under the head 17 from opposite ends as parts 3 and 4 are pushed back towards each other to assume a disposition as shown in FIG. 1. Now plate 14 is returned and placed onto parts 3 and 4, holding them together. As can be seen best upon comparing the top elevation of FIG. 2 with FIGS. 1 and 4, plate 1, i.e., the portions 3 and 4 thereof, have extensions which extend beyond the jaws, but there are recesses, and upon placing plate 14 onto part 1 these recesses receive the flanges 22, 22' in a manner permitting the down extension of the flanges for holding against end sidings 7 and 8, while turning of the locking plate on a vertical axis (transverse to the plane of the drawing of FIG. 2) is impeded.

With normal suspension for example of the stone 18 by shackle 16 the latter assumes a vertical orientation and holds eye parts 2', 2" together so that parts 3 and 4 cannot separate irrespective of part 14. However, the flange parts 22, 22' lock against parts 3, 4 so that in case carrier 16 turns or assumes even almost lateral disposition plate 14 holds still parts 3 and 4 together thus assuming continued engagement of the jaws 5, 6 etc and gripping thereof under anchored head 17.

After the stone has been placed in position, the assembly is decoupled analogous to the coupling, but with a reverse order of steps. The shackle may remain connected to the chain, but manipulation may be simpler if the chain and even locking plate 14 are separated from the assembly, so that the plate plus eye assembly can be coupled to the next stone and anchoring head without impediment by the chain and the locking plate.

The invention is not limited to the embodiments described above but all changes and modifications thereof not constituting departures from the spirit and scope of the invention are intended to be included.

I claim:

1. Equipment for coupling a shackle-like carrier with an elongated eye to the head of a member anchored in a piece of stone such as concrete or the like, wherein the head projects above the stone and is defined by two oppositely directed ridges of V shaped cross-section each, comprising:

a biparted assembly which includes a biparted eye and a biparted plate, with partitioning along a plane transverse to the center axis of the eye, the eye being linked to the shackle;

each part of the biparted plate having gripping jaws for gripping under and receiving a portion of the head;

the part of the biparted being movable with movement of the parts of the eye in the shackle-like carrier to separate the parts of the biparted plate for a distance to permit alignment of the head, the assembly when having its parts placed in abutment along the plane gripping the head by means of the jaws of each of the plate parts; and releasable means for holding the parts of the biparted assembly in said abutment and preventing separation.

2. Equipment as in claim 1, including means for preventing relative turning of the parts when in said abutment with each other.

3. Equipment as in claim 2, wherein the means for preventing turning includes at least one pin and indentation combination mating in the plate of abutment.

4. Equipment as in claim 1, wherein the receiving space of the jaws is closed laterally on opposite sides along and parallel to the axis through the eye.

5. Equipment as in claim 1, wherein the jaws are recessed adjacent to the abutment plane so that the jaws on one part of the biparted plate are recessed from the jaws on the other part of the plate when in assembled disposition.

6. Equipment as in claim 1 wherein the means for holding is a locking plate with an aperture receiving the eye and being placed on said biparted plate but liftable therefrom, the plate having flanges for bearing against the biparted plate from opposite sides along the direction of extension of the head, for preventing the jaws from slipping off the head.

7. Equipment as in claim 6, wherein the locking plate with aperture has means for preventing the shackle for assuming a disposition in which the parts of the eyes can be separated.

8. Equipment as in claim 1, wherein the means for holding is established by the shackle-like carrier when the elongated eye thereof is oriented so that the direction of extension of the respective elongation runs in or parallel to said plane.

9. Equipment as in claim 1, wherein the carrier includes two straight stem portions and a curved interconnection looping around the biparted eye when assembled and holding the parts of the biparted eye together when the stem portions extend parallel to the plane of partitioning.

* * * * *